United States Patent

Deeg et al.

(10) Patent No.: US 6,872,040 B2
(45) Date of Patent: Mar. 29, 2005

(54) FASTENER INCLUDING A SCREW AND A SUPPORTING ELEMENT

(75) Inventors: Wolfgang Deeg, Homberg/Ohm (DE); Gerhard Freidhof, Alsfeld (DE); Jürgen Hohl, Kirchhain (DE)

(73) Assignee: KAMAX-Werke Rudolf Kellermann GmbH & Co. KG, Osterode am Harz (DE)

( * ) Notice: Subject to any disclaimer, the term of this patent is extended or adjusted under 35 U.S.C. 154(b) by 0 days.

(21) Appl. No.: 10/412,162

(22) Filed: Apr. 11, 2003

(65) Prior Publication Data

US 2003/0194292 A1 Oct. 16, 2003

(30) Foreign Application Priority Data

Apr. 11, 2002 (DE) .......................................... 102 15 883

(51) Int. Cl.⁷ ............................................... F16B 35/04
(52) U.S. Cl. ........................................ 411/353; 411/999
(58) Field of Search .......................... 411/352, 353, 411/533, 999, 607

(56) References Cited

U.S. PATENT DOCUMENTS

| | | | | |
|---|---|---|---|---|
| 2,639,179 A | * | 5/1953 | Phelps | ............................. 292/251 |
| 2,987,811 A | * | 6/1961 | Acres | ............................. 29/437 |
| 3,041,913 A | * | 7/1962 | Liska | ............................. 411/87 |
| 4,212,224 A | | 7/1980 | Bragg, Jr. et al. | ............................. 85/1 K |
| 4,396,327 A | * | 8/1983 | Menke | ............................. 411/337 |
| 5,040,917 A | * | 8/1991 | Camuffo | ............................. 403/408.1 |
| 5,489,177 A | | 2/1996 | Schmidt, Jr. | ............................. 411/369 |
| 6,082,942 A | * | 7/2000 | Swick | ............................. 241/27 |
| 6,227,783 B1 | * | 5/2001 | Salameh | ............................. 411/353 |

FOREIGN PATENT DOCUMENTS

| | | | |
|---|---|---|---|
| DE | 1812906 | 6/1960 | |
| DE | 21072 | 11/1969 | |
| DE | 19534034 A1 | 3/1997 | ........... F16B/41/00 |
| DE | 29711296 U1 | 8/1997 | ........... F16B/41/00 |
| DE | 19750658 C1 | 3/1999 | ........... F16B/41/00 |
| DE | 19924502 A1 | 12/2000 | ........... F16B/41/00 |

\* cited by examiner

Primary Examiner—Flemming Saether
(74) Attorney, Agent, or Firm—Thomas, Kayden, Horstemeyer & Risley, LLP

(57) ABSTRACT

A fastener (1) includes a screw (2) and a supporting element (3). The screw (2) includes a head (4), a shank (8) and a threaded portion (12). The threaded portion (12) is located on the shank (8). The threaded portion (12) includes a thread having an outer diameter (14). The threaded portion (12) includes a thread runout (25) facing the head (4) of the screw (2). The shank (8) includes a shank portion (10) having a diameter (11) which is smaller than the outer diameter (14) of the thread. The supporting element (3) is captively connected to the screw (2), and it includes at least one narrow location (27). The narrow location (27) has a diameter (28) which is smaller than the outer diameter (14) of the thread. The narrow location (27) includes at least one surface element (30, 35) facing the thread runout (25) and forming an enveloping cone (31) enveloping the thread runout (25) to prevent the supporting element (3) from getting clamped at the thread runout (25) of the screw (2).

17 Claims, 6 Drawing Sheets

FASTENER INCLUDING A SCREW AND A SUPPORTING ELEMENT

CROSS REFERENCE TO RELATED APPLICATIONS

This application claims priority to co-pending German Patent Application No. 102 15 883.5 entitled "Verbindungselement mit einer Schraube und einem daran unverliebar angeordneten Stützelement", filed Apr. 11, 2002.

FIELD OF THE INVENTION

The present invention generally relates to a fastener including a screw and a supporting element. The supporting element is captively and rotatably connected to the screw. For example, the supporting element may be designed as a bush, a plain washer, and the like. The fastener includes at least these two elements being captively connected to one another. However, it may also include additional elements. The elements of the fastener are produced in series to attain a great prefabrication ratio, and to simplify and to accelerate assembly of the fasteners. Usually, the screw and the supporting element are both made of metal. However, it is also possible to design at least one of the two elements to be made of a different material, for example plastic.

BACKGROUND OF THE INVENTION

A fastener is known from German Patent Application No. 199 24 502 A1. The known fastener includes a screw including a head and a shank. The head includes a supporting surface. The shank includes a cylindrical shank portion and a threaded portion including a thread. The cylindrical shank portion is located close to the head of the screw, and the threaded portion is located more or less close to the free end of the shank of the screw. The supporting element may be designed as a bush, a plain washer, and the like. The supporting element may also include a plurality of such elements. The supporting element includes a narrow location having a diameter which is smaller than the outer diameter of the threaded portion. The narrow location may be realized in a variety of different ways, for example by impressions being located on the circumference of the bush or by a continuous protrusion protruding towards the inside. It is also possible to arrange additional elements, for example a securing ring, in the inner diameter of the bush. When a plain washer forms the supporting element, the bore of the plain washer forms the narrow location in a way that it forms a continuous protrusion protruding towards the inside of the bush. The shank portion has a reduced diameter, meaning a diameter which is smaller than the outer diameter of the thread of the threaded portion. The reduced diameter of the shank portion may correspond to the rolling diameter of the screw during its manufacture.

When a thread is produced at the shank of the screw, especially by rolling, one automatically produces a thread runout facing the head of the screw. The diameter of the thread and of the threads, respectively, increases in the region of the thread runout facing the head of the screw. For example, the diameter increases from the rolling diameter to the outer diameter of the thread of the threaded portion being directly connected to the end of the thread. There are two different known standards for the thread runout: one is the "normal design" and the other one is the so called "short design". In the normal design, the thread or the convolution extends about 2.5 rotations of the screw, meaning about 900°. In this portion, the outer diameter of the thread changes. The short design of the thread runout extends about 1.25 rotations, meaning 450°. Even shorter thread runouts are theoretically possible, but they cannot be produced in an economic way since the usable periods of time of the tools serving to roll the thread are comparatively short. No matter whether one uses the normal design or the short design, there is a theoretical (conical) enveloping cone in the region of thread runout of the thread of the screw. The supporting element with its narrow location may contact the enveloping cone. When one imagines the layout of the convolution of the thread of the threaded portion in a plane, there is a very long inclined plane having a comparatively small angle of inclination. The enveloping cone and this inclined plane of the thread runout, respectively, has the effect of the known supporting element getting clamped in the region of the thread runout.

Fasteners of this kind are especially used as dump elements at assembly stations. Usually, an automatic feeding station and a conveying station, respectively, is prearranged to the assembly station, the feeding station serving to place the fasteners in a position such that their axes are aligned, and such that the fasteners are located in a row. Such conveying apparatuses often use vibration drives. Due to the resulting vibrations, there is the danger of the supporting element getting fixedly connected to and engaging the screw such that the known fastener cannot be properly mounted in the assembly station. Even when the fasteners are separately fed to their place of application, there is the danger of the supporting element getting clamped in the region of the thread runout during transportation in a box, for example. These drawbacks do not only occur when the narrow location of the supporting elements is designed as local impressions being spaced apart the about the circumference of the supporting elements, but also when the narrow locations are designed to be continuous about the circumference of the supporting element. When choosing local impressions, there is the additional danger of these local impressions getting fixed by vibrations in the position in which they engage two adjacent convolutions of the thread in the region of the thread runout facing the head of the screw.

Another fastener including a screw and a supporting element being captively connected to the screw is known from U.S. Pat. No. 5,489,177. Especially, the supporting element is designed as a bush. In contrast to the fastener known from German Patent Application No. 199 24 502 A1 (which shows the production of the narrow locations at the bush being realized after having pushed the bush over the shank of the screw) U.S. Pat. No. 5,489,177 teaches to separately produce the screw, on the one hand, and the bush, on the other hand, and to afterwards connect the two elements. During the axial movement of the bush over the screw, the bush in the region of its narrow location is elastically expanded. After having passed a protrusion being located at the screw, the narrow location attains a comparatively small diameter. The screw includes a rolled protrusion being located between the thread of the screw and the cylindrical shank portion having a reduced diameter. The narrow location being located at the bush is produced at certain circumferential locations by axial displacement of material. The rolled protrusion at the screw has a conical surface allowing for pushing the narrow location of the bush beyond the protrusion of the screw. There is no danger of clamping of the narrow location at the outer diameter of the threaded portion—and also at the thread runout—since the narrow location and the threaded portion of the screw do not get in contact with one another.

SUMMARY OF THE INVENTION

The present invention relates to a fastener. The fastener includes a screw and a supporting element. The screw includes a head, a shank and a threaded portion. The threaded portion is located on the shank. The threaded portion includes a thread having an outer diameter. The threaded portion and the thread, respectively, includes a thread runout facing the head of the screw. The shank includes a shank portion having a diameter which is smaller or less than the outer diameter of the thread. The supporting element is designed and arranged to be captively connected to the screw, and it includes at least one narrow location. The narrow location has a diameter which is smaller or less than the outer diameter of the thread. The narrow location includes a surface element being designed and arranged to face the thread runout and to form an enveloping cone enveloping the thread runout.

The present invention also relates to a fastener assembly including a screw and a supporting element. The screw includes a head, a shank and a threaded portion. The threaded portion is located on the shank, and it includes a thread including a lead, a thread runout facing the head and an outer diameter. The shank includes a shank portion having a diameter which is less than the outer diameter of the thread. The supporting element includes a narrow location, and it is designed and arranged to be captively connected to the screw. The narrow location has an inner surface and a diameter which is less than the outer diameter of the thread to captively connect the supporting element to the screw. The narrow location at its inner surface includes a contact element being designed and arranged to face the thread runout. The contact element is designed to have a conical shape and a length being more than the lead of the thread.

The novel fastener includes at least two elements—a screw and a supporting element—with which clamping effects are substantially reduced especially when the fastener is automatically transported before assembly at a component.

With the novel fastener, the supporting element is designed in a way that the end of the thread of the threaded portion facing the head of the screw is surrounded by a cone. The cone being formed by at least a portion of the inner surface of the supporting element is always positioned outside of the recesses of the end of the thread—meaning in a way that it does not engage the thread. The end of the thread of the threaded portion is also called the thread runout herein.

The advantageous effect of the novel supporting element not to engage the thread of the screw is achieved no matter whether the end of the thread is designed as a "normal" thread runout or as a "short" thread runout. With the cone-like enveloping design of the supporting element, there are no clamping effects as they are known in the prior art. The tips of the convolution or the convolutions of the end of the thread also form a cone. This cone is surrounded or enveloped by the second cone at least rudimentary being formed by one or more separate surface element of the supporting element. However, it is also possible to design the supporting element and a part of its inner surface, respectively, to be similar to a more or less complete truncated cone. The truncated cone of the supporting element forms the envelope for the thread runout of the screw. Usually, the cone angles of these two cones will be different such that there only is punctual or—at the most—linear contact between the supporting element and the end of the thread. This limited contact cannot lead to clamping effects. Self-locking is the limit for determining the coordination of the two cone angles with respect to one another.

It is especially preferred if the cone-like envelope of the end of the thread facing the head of the screw has a cone angle being identical to or smaller than the cone angle of the end of the screw facing the head of the screw. In other words, the cone angle is not greater than the cone angle of the end of the thread. When the two cone angles are identical, there is a thread-like contact line if the tips of the convolutions of the end of the thread are also located on a cone. It is even more preferred if the cone angle of the envelope is less than the cone angle of the end of the thread facing the head of the screw. In this case, there will be approximately punctual contact between the screw and the supporting element, this contact securely preventing clamping between the elements of the novel fastener.

It has been found advantageous to design the cone angle of the cone-like envelope of the end of the thread facing the head of the screw such that it has a value of approximately between 3° and 8°. This design is associated with a cone angle of the end of the thread which usually is in a range of approximately 8°. However, the cone angle of the cone-like envelope should be chosen not to be too small. A good separation effect between the screw and the supporting element is realized if the cone angle of the cone-like envelope of the end of the thread facing the head of the screw is approximately 5°.

The extension of the cone-like envelope of the supporting element of the fastener is of some importance. To be exact, this is not the extension exactly in the direction of the axis of the screw, but rather the extension in the cone direction. It is preferred if the at least one surface element has a length which is greater or more than the lead of the thread of the threaded portion. The length of the surface element may be a multiple of the lead of the thread of the threaded portion. Preferably, the length of the surface element is approximately between twice and three times greater than the lead of the thread of the threaded portion. The lower limit is approximately in the range of the value of the lead of the thread of the threaded portion. Due to this (almost) axial length of the surface elements or of the entire enveloping surface, respectively, punctual contact or line contact between the elements of the fastener is increased when using the same cone angle. On the other hand, it is ensured that there are no clamping effects in the recesses of the convolutions of the end of the thread.

There is a number of different possibilities of designing the enveloping cone being located at the supporting element and being arranged to surround the end of the thread of the screw. In a first exemplary embodiment, the surface elements are formed by separate, local impressions being located at the supporting element, the impressions being uniformly spaced apart the circumference of the inner surface of the supporting element. The supporting element at least includes two local impressions. Preferably, it includes at least three or four impressions. However, it may include even more impressions. These local impressions are usually produced after having pushed the supporting element onto the screw. In this way, there is the advantage of the surface of the screw not being damaged.

Another possibility is to design the surface element as a continuous inclined surface being located at the supporting element. Such an inclined surface practically forms a truncated cone being continuous about the circumference to form the envelope. This inclined surface—as well as the surface elements being formed by the impressions—is a surface being located at the inside of the supporting element to face and to cooperate with the upper end of the thread of the threaded portion of the screw. The upper end means the end facing the head of the screw and facing away from the free end of the screw. Such a continuous inclined surface may be produced by rolling the supporting element. This is especially possible when the supporting element has a comparatively great axial length, meaning when it is designed as a bush and the like. However, it is also possible that the supporting element including the inclined surface has the design of a disk, and that it is captively connected to the thread of the threaded portion which has been produced after having pushed the disk onto the screw. Such a disk-like design of the supporting element—meaning a supporting element having a comparatively short axial length— sometimes does not allow for arranging or producing the inclined surface or the local impressions after having assembled the screw and the supporting element. In such cases, it is preferred to completely produce the disk-like supporting element before assembly at the screw, and to push the supporting element onto the shank of the screw, and to then produce the thread of the threaded portion at the shank of the screw. This is especially simple when the supporting element—due to its disk-like design—has an axial extension which is substantially smaller than the axial extension of the shank portion having a reduced diameter in which the supporting element may be moved.

The supporting element may be designed to transmit an axial force. This applies to the disk-like design of the supporting element. However, when the supporting element is designed as a bush, the bush may also serve to transmit an axial force, and to limit the maximum screwing depth, for example.

When using local impressions, it makes sense when the local impressions are located in the upper portion of the bush facing the head of the screw. In this way, the space between the supporting element and the screw is advantageously increased. The supporting element may extend over a great portion of the threaded portion in the non-mounted position, and it protects the thread from being damaged. It is to be understood that the axial length of a bush-like supporting element is coordinated with the axial length of the shank portion of the screw having a reduced diameter.

Other features and advantages of the present invention will become apparent to one with skill in the art upon examination of the following drawings and the detailed description. It is intended that all such additional features and advantages be included herein within the scope of the present invention, as defined by the claims.

BRIEF DESCRIPTION OF THE DRAWINGS

The invention can be better understood with reference to the following drawings. The components in the drawings are not necessarily to scale, emphasis instead being placed upon clearly illustrating the principles of the present invention. In the drawings, like reference numerals designate corresponding parts throughout the several views.

DETAILED DESCRIPTION

Figure 1:
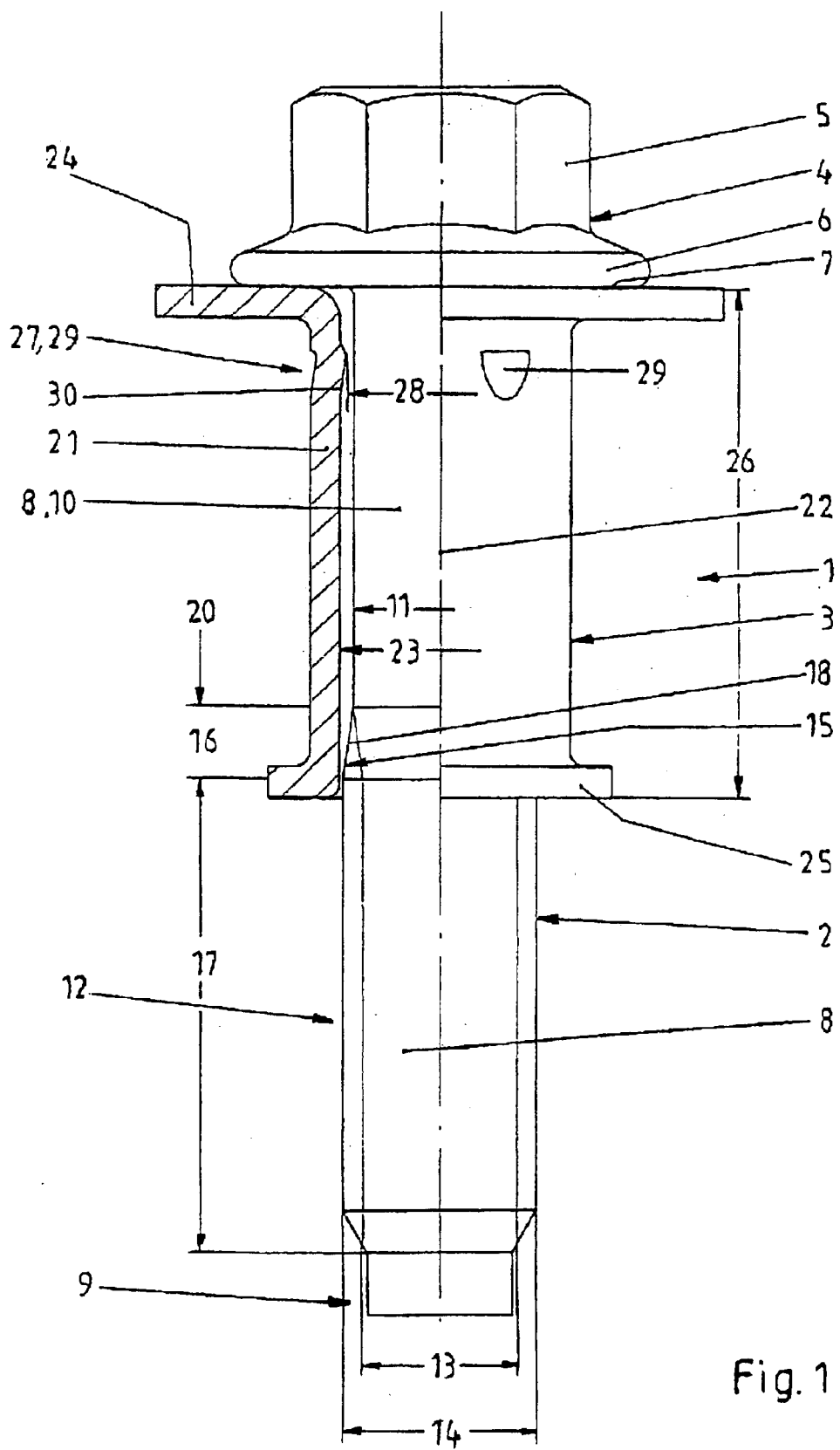
FIG. 1 is a side view of a first exemplary embodiment of the novel fastener including a bush-like supporting element.

Referring now in greater detail to the drawings, FIG. 1 illustrates a first exemplary of the novel fastener 1. The fastener 1 or fastener assembly includes two or more components. Especially, it includes a screw 2 and a supporting element 3.

In the illustrated exemplary embodiment of the novel fastener 1, the screw 2 is designed as a collar screw. However, it may also have a different design. The screw 2 includes a head 4 including an engagement surface 5 for a torsional tool for operating the screw and a collar 6 including a supporting surface 7 serving to transmit an axial force onto a component (not illustrated). A shank 8 extends from the head 4 and from its supporting surface 7, respectively, to the free end 9 of the screw 2. The shank 8 in the region of the free end 9 may include a centering portion. The shank 8 at its side facing the head 4 includes a shank portion 10 having a diameter 11 which is less or smaller than the diameter of a thread to be described herein below.

A threaded portion 12 is located in the region of the end 9 of the screw 2. However, it may also be located at a different place of the screw 2, for example in a middle portion of the shank 8 or close to the head 4. The thread of the threaded portion 12 has a core diameter 13 and an outer diameter 14. A thread runout 15 (or an end of the thread) facing the head 4 of the screw 2 is located between the shank portion 10 having the diameter 11 and the threaded portion 12. The end of the thread 15 extends along the screw 2 about a length 16. The threaded portion 12 including the opposite end of the thread facing the free end 9 has a length 17.

It may already be seen in FIG. 1 that the thread runout 15 forms a (truncated) cone 18. The thread runout 15 has a conical design at this place. This means that it has the shape of a (truncated) cone 18. The cone 18 of a comparatively long thread runout 15 ("normal design") is respectively longer than the one of a comparatively shorter thread runout 15 ("short design"). The cone 18 usually has a cone angle 19 (FIG. 6) of approximately 8°. The reduced diameter 11 of the shank portion 10 usually has a value between the core diameter 13 and the outer diameter 14 of the threaded portion 12. The shank portion 10 extends along a length 20 starting at the supporting surface 7 of the head of the screw 2 and ending at the beginning of the end of the thread 15 facing the head 4 of the screw 2. The screw 2 has a usual design known from the prior art.

The novel supporting element 3 illustrated in FIG. 1 is designed as a bush 21 having the shape of a hollow cylinder. It has an inner diameter 23, and it is arranged in a way to be approximately symmetrical with respect to the axis 22 of the screw 2. In the illustrated embodiment, the inner diameter 23 is greater than the outer diameter 14 of the threaded portion 12 such that the bush 21 may be pushed upon the shank 8 of the screw 2 after having produced the thread of the threaded portion 12. The bush 21 at its two ends may include flanges 24 and 25 extending in a radial direction. The bush 21 has a length 26 extending in an axial direction, meaning parallel to the axis 22. Usually, the length 26 is greater than the sum of the lengths 16 and 20 such that the bush 21 ends in the region of the end of the thread 15. However, the length 26 may also be chosen to be shorter to allow for screwing over the threaded portion 12. Due to the chosen diameters, the bush 21 and the supporting element 3, respectively, may be rotated with respect to the screw 2.

The supporting element 3 includes a narrow location 27 or narrowing having a diameter 28 which is smaller than the outer diameter 14 of the threaded portion 12. The narrow location 27 may be formed by a plurality of impressions 29. The impressions 29 may be produced after having rolled the thread of the threaded portion 12 and after having pushed the bush 21 onto the screw 2. The impressions 29 being located at the inner diameter 23 of the bush 21 include surface elements 30, and they form these surface elements 30 or contact elements, respectively. These elements 30 are part of a (incomplete) surrounding cone or enveloping cone 31, and they together form such an enveloping cone 31 (FIG. 6), respectively. The enveloping cone 31 has a cone angle 32. However, the narrow location 27 may also be designed in a different way, for example, by one continuous protrusion protruding inwardly towards the screw, by an inclined surface being part of a truncated cone and the like.

Figure 6:
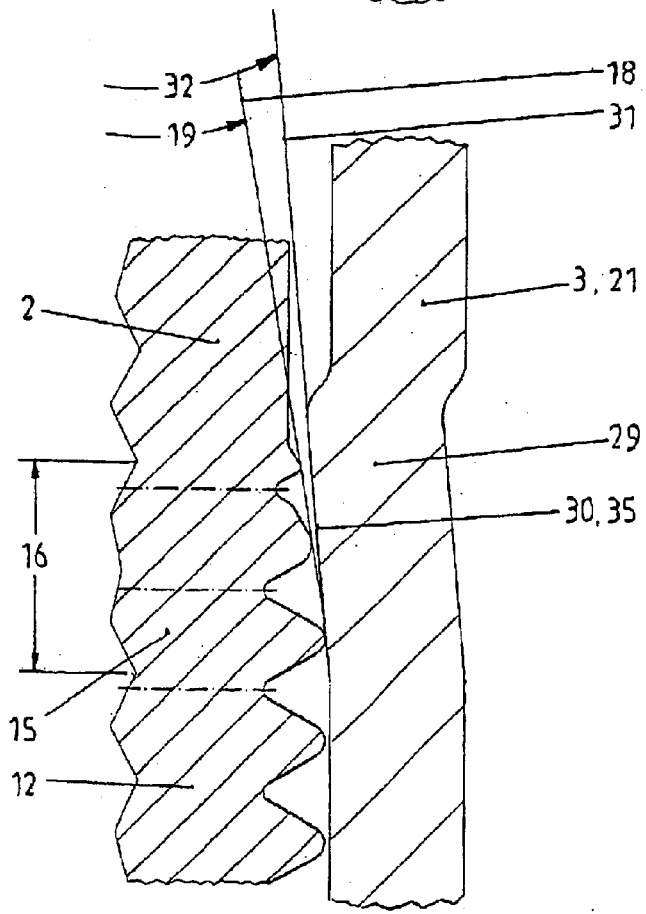
FIG. 6 is a semi-sectional enlarged view of the novel supporting element surrounding the thread runout.

The supporting element of the novel fastener includes impressions 29 forming surface elements 30 being part of an enveloping cone 31, the surface elements 30 facing and being associated with the end of the thread 15 of the screw 2. The (incomplete) enveloping cone 31 being formed by the surface elements 30 of the impressions 29 envelopes the (truncated) cone 18 of the end of the thread 15, as it is to be seen in FIG. 6. The cone angle 19 of the cone 18 of the end of the thread 15 usually is in a range of approximately 8°. The cone angle 32 of the enveloping cone 31 is chosen to have approximately the same angle, or to be less. FIG. 6 illustrates a smaller cone angle 32 of a value of approximately between 3° and 8°. Preferably, the cone angle 32 may have a value of 5°. Due to the coordinated design of the end of the thread 15 of the screw 2 and the impressions 29 with the surface elements 30 of the supporting element 3 and the resulting enveloping cone 31, one achieves punctual support of the supporting element 3 at the end of the thread 15 when the novel fastener 1 with its head 4 is transported in an upward direction, and when a transporting or conveying element engages the supporting surface 7 being located at the head 4 of the screw 2. Consequently, clamping of the supporting element 3 at the screw 2 is securely prevented. During assembly of the fastener 1, the supporting element 3 automatically takes the desired relative position by the flange 24 contacting the supporting surface 7.

Figure 2:
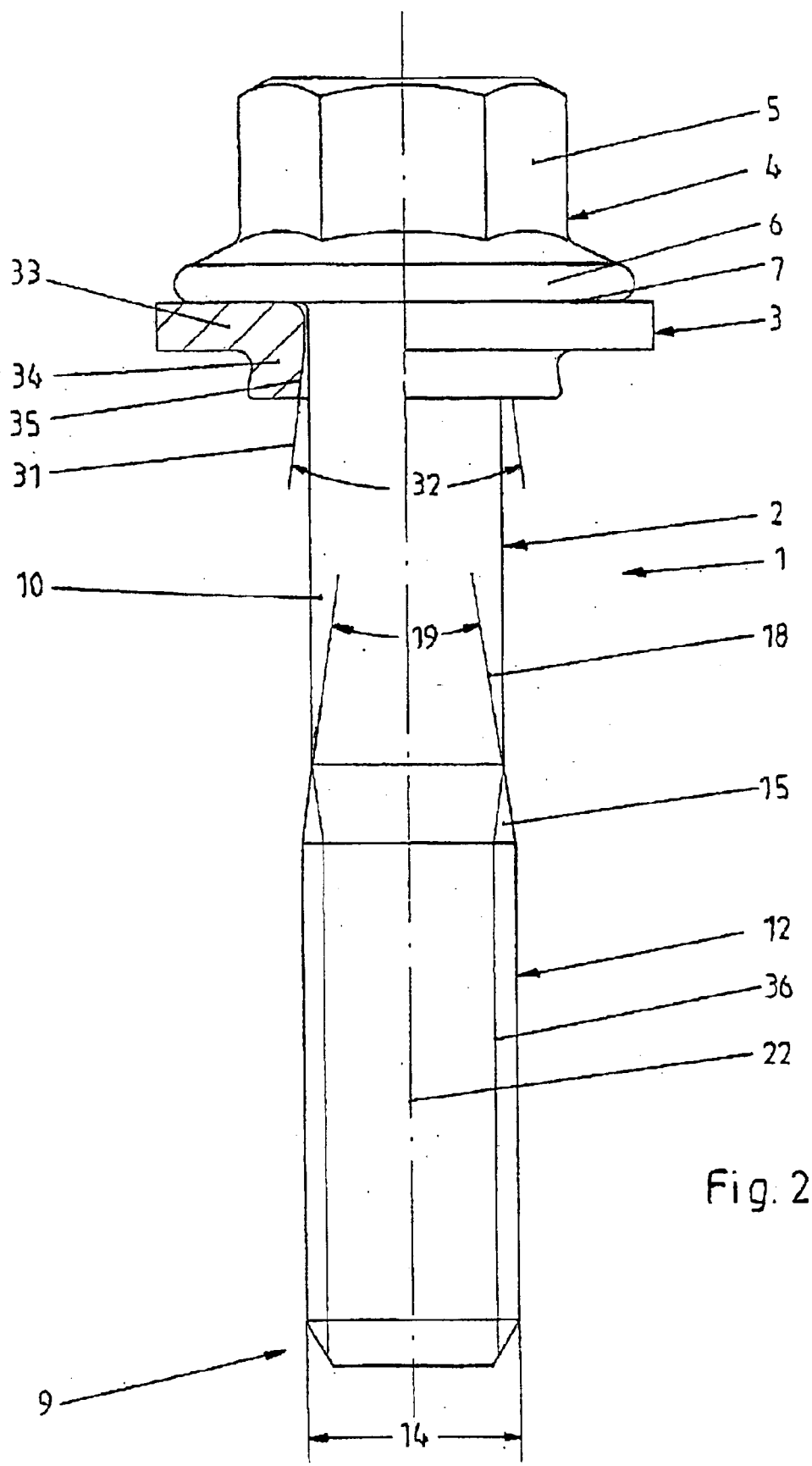
FIG. 2 is a side view of a second exemplary embodiment of the novel fastener including a disk-like supporting element.

FIG. 2 illustrates another exemplary embodiment of the novel fastener 1 including a screw 2. In this embodiment, the supporting element 3 is designed as a disk 33. The disk 33 includes a collar-like protrusion 34 extending in an axial direction. The protrusion 34 at its inner surface includes a continuous inclined surface 35. This surface 35 fulfills the same function as the surface elements 30 of the embodiment according to FIG. 1. The surface 35 is also located on the enveloping cone 31 at the cone angle 32.

The following steps of manufacture of the fastener 1 according to FIG. 2 are preferred:

First, the screw 2 is produced as a separate element, the shank 8 having the rolling diameter along its entire length.

The supporting element 3 in the form of a disk 33 is produced to reach its final properties. For example, the surface of the disk 33 is produced such that it reaches the desired final properties. This includes the inclined surface 35.

Then, the supporting element 3 is pushed upon the shank 8 of the screw 2. Afterwards, a thread 36 is produced in the region of the threaded portion 12 of the thread 2 by rolling and by thread rolling, respectively. The thread 36 includes the end of the thread 15. Due to the production of the threads of the thread 36, material of the shank 8 of the screw 2 is displaced in a radial direction towards the outside such that the outer diameter 14 of the threaded portion 12 is attained. The outer diameter 14 is greater than the inner diameter of the disk 33. In this way, the supporting element 3 is connected to the screw 2 in a captive and rotatable way. Rolling of the thread 36 is especially simple when the disk 33 only has a comparatively short axial length. Rolling is especially simple when the length of the disk 33 is less than the length of the shank portion 10 of the shank 8 having a reduced diameter.

Figure 3:
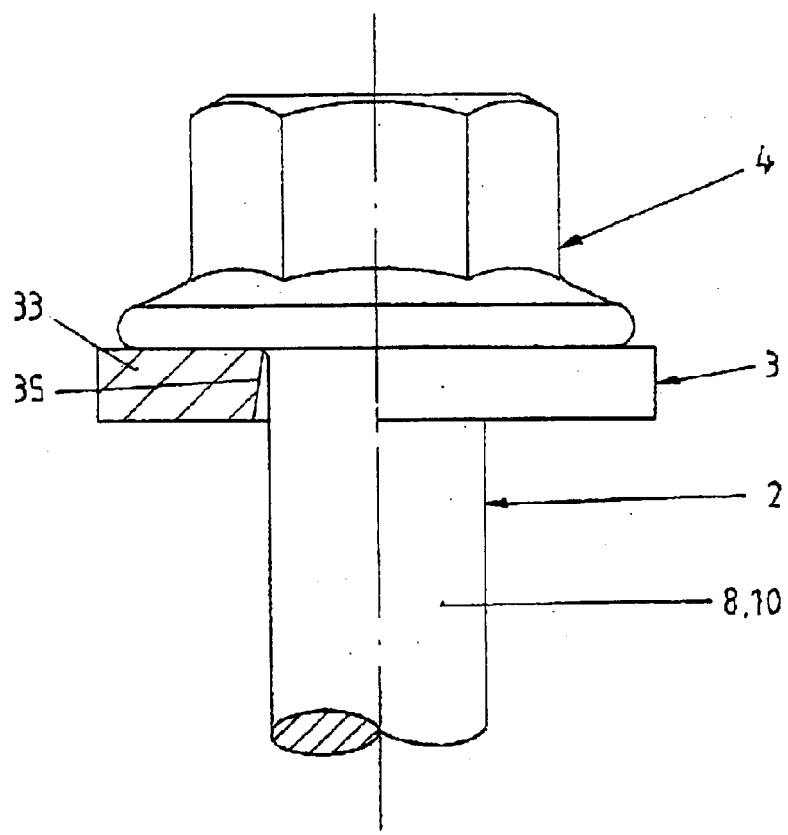
FIG. 3 is a partial view of another exemplary embodiment of the novel fastener.
Figure 4:
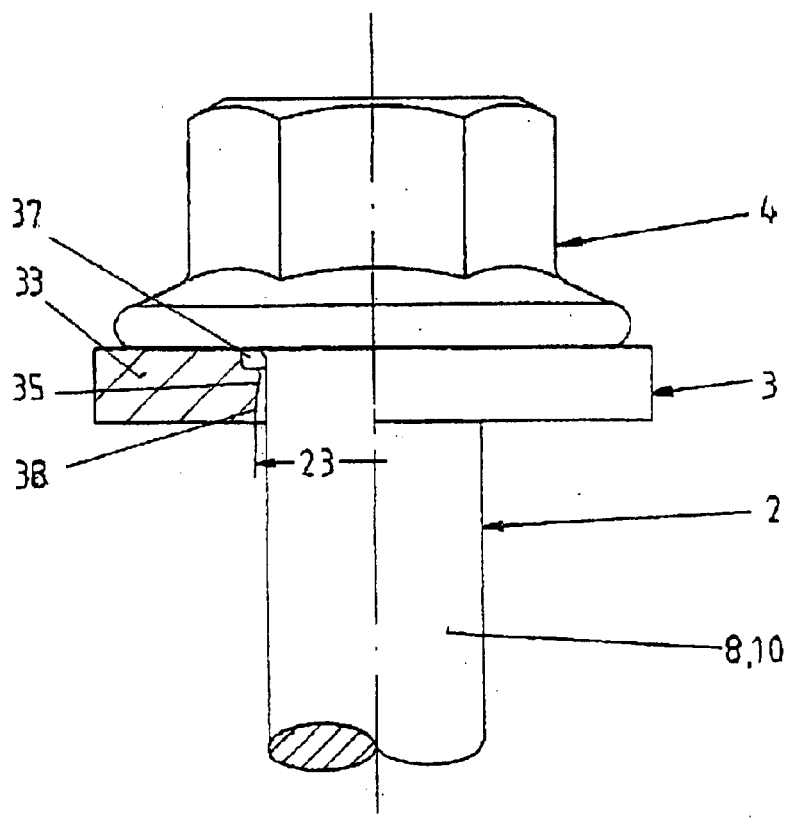
FIG. 4 is a partial view of another exemplary embodiment of the novel fastener.

The embodiment of the novel fastener 1 illustrated in FIGS. 3 and 4 also include a supporting element 3 being designed as a disk 33. Especially, the disk 33 is designed as plain washer, meaning such that it does not include collar-like protrusions (see the protrusion 34 in FIG. 2).

According to FIG. 3, the inclined surface 35 of the disk 33 extends along the entire thickness of the disk 33. The disk 33 consequently has a cone-like opening or a truncated cone-like opening being part of the enveloping cone 31.

In the exemplary embodiment of the novel fastener 1 according to FIG. 4, the inclined surface 35 only extends along a middle portion of the axial extension of the disk 33. The disk 33 at its upper side facing the head 4 of the screw 2 includes a recess 37. The recess 37 is coordinated with the transition radius of the shank portion 10 and the supporting surface 7. The inclined surface 35 may directly contact the bottom side of the disk 33. Alternatively, the inclined surface 35 may be connected to a cylindrical portion 38 (as illustrated in FIG. 4). The cylindrical portion 38 has an inner diameter which is greater than the outer diameter of the threaded portion 12 to prevent clamping of the cylindrical portion 38 with respect to the end of the thread 15.

Figure 5:
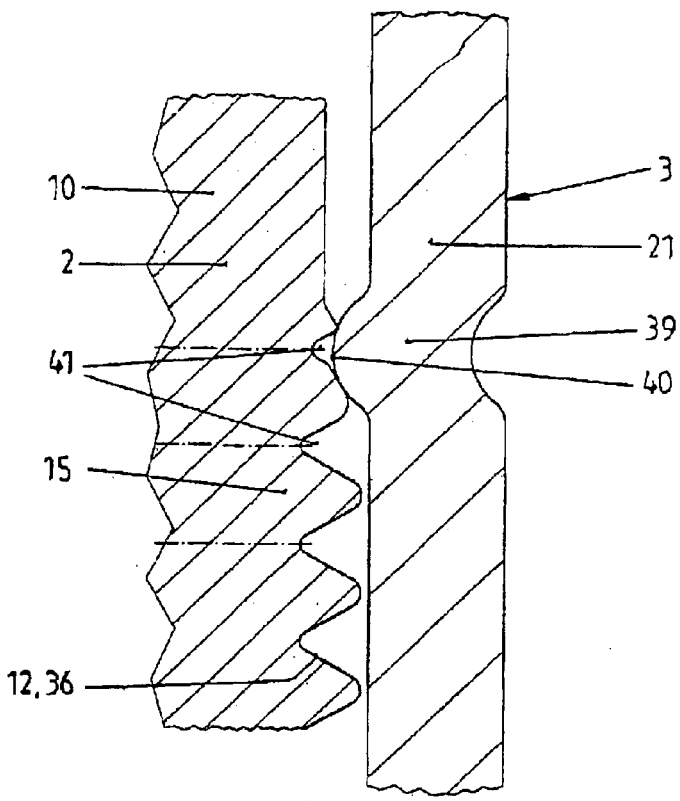
FIG. 5 is a semi-sectional enlarged view of a common thread runout and a supporting element (prior art).

FIG. 5 illustrates a prior art fastener. FIG. 5 is a semi-sectional view at an enlarged scale of a part of the screw 2 including the end of the thread 15 and the thread 36 of the threaded portion 12. The end of the thread 15 extends in an axial direction between the shank portion 10 having a reduced diameter and the threaded portion 12. A part of a bush 21 and of a supporting element 3 is illustrated in association with the shank portion 10. The supporting element 3 of the prior art fastener includes impressions 39 being located approximately in the middle region of its axial extension and being spaced apart the circumference. The impressions 39 are produced by pressing from the outside towards the inside. Depending on the design of the pressing tool, the impressions 39 have a surface 40 protruding in a radial inward direction and being similar to a ball. The surface 40 may also be designed to have a slightly rounded design. However, the surface 40 in the prior art is always designed such that it engages an impression 41 being located between two adjacent threads of the end of the thread 15. In this way, the prior art supporting element 3 as illustrated in FIG. 5 is clamped at the end of the thread 15 of the screw 2, and it interlocks with the end of the thread 15, respectively.

FIG. 6 illustrates the novel fastener 1 including the surface elements 30 and the inclined surface 35, respectively, as being a component of the enveloping cone 31 having a smaller cone angle 32. It is to be seen from FIG. 6 that the cone 18 or truncated cone of the thread runout 15 only punctually contacts the end of the thread 15. At the most, there may be line contact. The limit for the cone angle 32 is determined by self-locking effects. Although FIG. 6 illustrates the supporting element 3 as being designed as a bush 21, the same applies to the supporting element 3 being designed as a disk 33.

Figure 7:
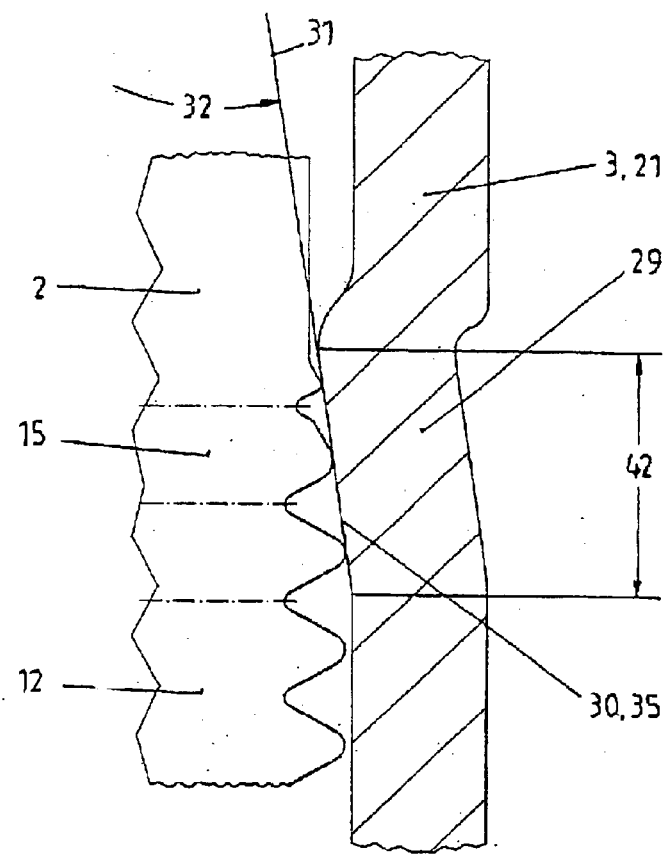
FIG. 7 is a semi-sectional enlarged view of another exemplary embodiment of the novel fastener illustrating the principles of enveloping the thread runout by the supporting element.

FIG. 7 illustrates another possible exemplary embodiment of the novel fastener 1. The supporting element 3 may include local impressions 29 forming the surface elements 30. However, the same applies to a continuous protrusion-like deformed portion including a respective inclined surface 35. FIG. 7 makes it clear that the surface element 30 and the inclined surface 35, respectively, preferably has a length 42 which preferably is not less than the lead of the thread of the threaded portion 12 and of the thread 15 runout, respectively. To be exact, the length 42 extends in the direction of the surface of the cone. The lead of the thread runout 15 is indicated by dot and dash lines in FIG. 7. The lead is to be understood as the distance between two dot and dash lines. The illustrated exemplary embodiment of the novel fastener 1 is chosen such that the length 42 of the supporting element 3 is slightly greater than double value of the lead of the thread of the screw 2. The surface elements 30 and the inclined surface 35 are part of the enveloping cone 31 having the cone angle 32. The surface element 30 and the inclined surface 35, respectively, at its end facing the lower end 9 of the screw 2 is directly connected to the inner diameter of the bush 21 and of the supporting element 3, respectively. It is also to be seen from FIG. 7 that the enveloping cone 31 in the illustrated exemplary embodiment of the fastener 1 has such a length which is greater than the length of the thread runout 25. This means that the enveloping cone 31 completely covers the thread runout 25.

Figure 8:
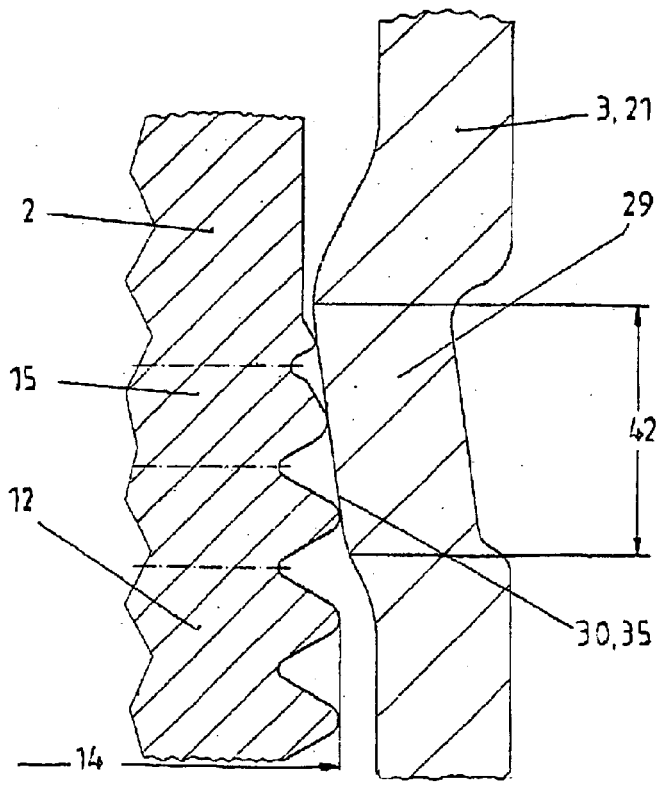
FIG. 8 is a view of another exemplary embodiment of the novel fastener.

FIG. 8 illustrates a slightly different exemplary embodiment of the novel fastener 1. The impressions 29 with the surface elements 30 and the continuous protrusion including the inclined surface 35, respectively, extends in an axial direction along the length 42. The radial deformation of the supporting element 3 is emphasized compared to the embodiment according to FIG. 7 such that there is greater clearance between the bush 21 and the outer diameter 14 of the threaded portion 12.

Figure 9:
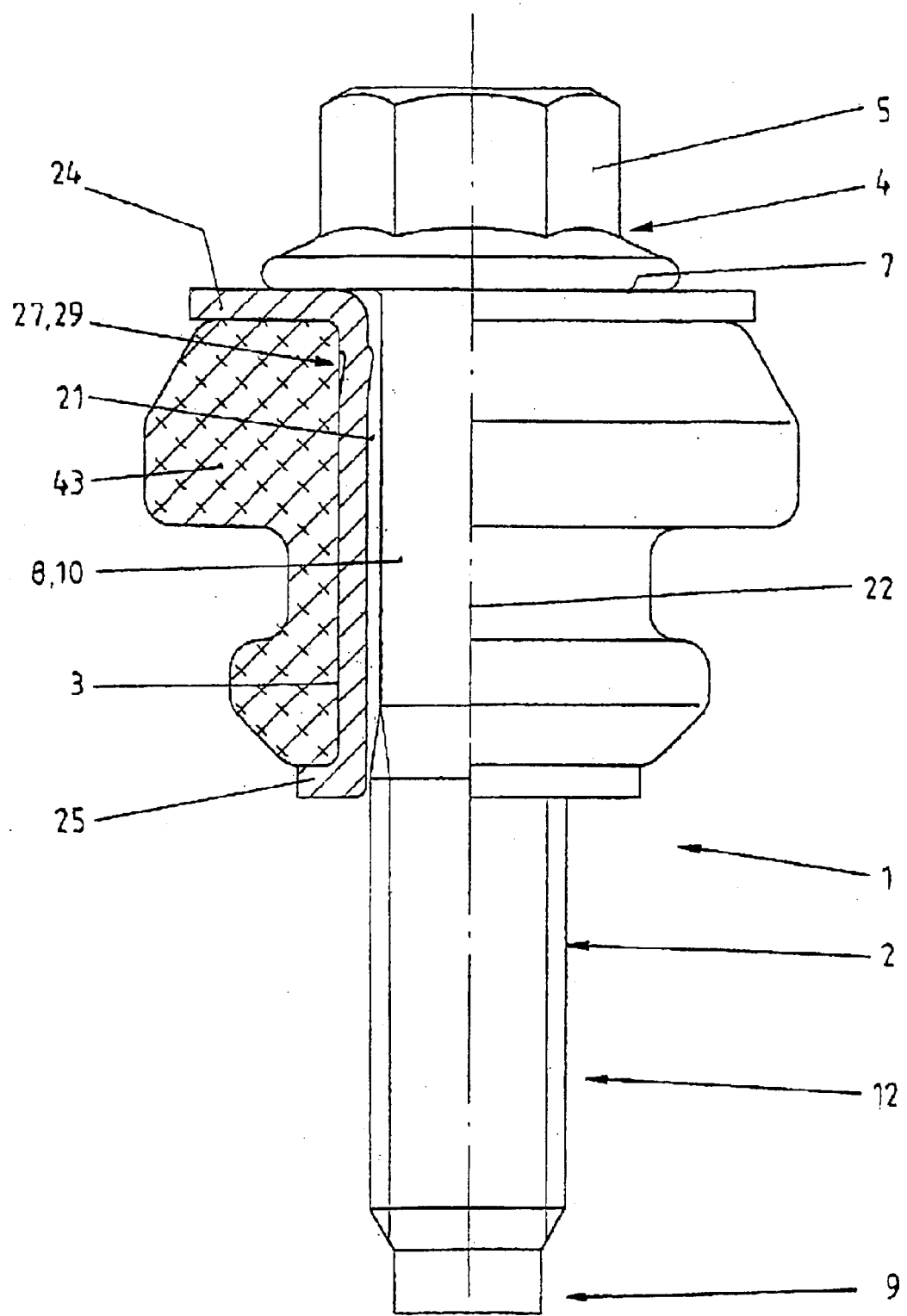
FIG. 9 is a view of another exemplary embodiment of the novel fastener.

FIG. 9 illustrates another exemplary embodiment of the novel fastener 1 being similar to the one illustrated in FIG. 1. Consequently, it is referred to the above description related to FIG. 1. The fastener 1 illustrated in FIG. 9 includes a supporting element 3 with two flanges 24 and 25. The flanges 24 and 25 serve to support and to arrange an elastomer element 43 extending along the entire length between the flanges 24 and 25. In this way, the novel fastener 1 may serve for soundproof fixing purposes. Support on a component is realized in the middle portion of the elastomer element 43 such that the bush 3 does not have to transmit an axial force. The elastomer element 43 does not necessarily have to extend along the entire length between the flanges 24 and 25, but it may also be designed to be shorter. Furthermore, it is possible to design the screw 2 as a center collar screw, meaning to arrange another functional element at the head 4. All these different embodiments may be used in connection with the present invention.

Many variations and modifications may be made to the preferred embodiments of the invention without departing substantially from the spirit and principles of the invention. All such modifications and variations are intended to be included herein within the scope of the present invention, as defined by the following claims.

We claim:

1. A fastener, comprising:
   a screw including a head, a shank and a threaded portion, said threaded portion being located on said shank and including a thread having an outer diameter, said threaded portion including a thread runout facing said head, said thread runout having a cone angle, said shank including a shank portion having a diameter which is smaller than the outer diameter of said thread; and
   a supporting element being designed and arranged to be captively connected to said screw and including a narrow location,
   said narrow location having a diameter which is smaller than the outer diameter of said thread,
   said narrow location including a surface element being designed and arranged to face said thread runout and to form an enveloping cone enveloping said thread runout, said enveloping cone having a cone angle, the cone angle of said enveloping cone not being greater than the cone angle of said thread runout and being approximately between 3° and 8°.

2. The fastener of claim 1, wherein said cone angle of said enveloping cone is approximately 5°.

3. The fastener of claim 1, wherein said thread has a lead and said surface element has a length which is greater than the lead of said thread.

4. The fastener of claim 1, wherein said narrow location includes a plurality of surface elements being formed by local impressions, said local impressions being arranged at an inner surface of said supporting element to be uniformly distributed about the circumference of said supporting element.

5. The fastener of claim 4, wherein said local impressions are located in an upper portion of said supporting element to face said head of said screw.

6. The fastener of claim 1, wherein said surface element is formed by a continuous inclined surface being located at an inner surface of said supporting element.

7. The fastener of claim 6, wherein said supporting element including said inclined surface is designed as a disk.

8. The fastener of claim 7, wherein said disk is captively connected to said screw after rolling said thread of said threaded portion.

9. The fastener of claim 1, wherein said supporting element is designed and arranged to transmit an axial force.

10. The fastener of claim 1, wherein said supporting element is designed as a bush.

11. The fastener of claim 1, wherein said supporting element is designed as a plain washer.

12. A fastener assembly, comprising:
    a screw including a head, a shank and a threaded portion, said threaded portion being located on said shank and including a thread including a lead, a thread runout facing said head and an outer diameter, said thread runout having a cone angle,
    said shank including a shank portion having a diameter which is less than the outer diameter of said thread; and
    a supporting element including a narrow location and being designed and arranged to be captively connected to said screw,
    said narrow location having an inner surface and a diameter which is less than the outer diameter of said thread to captively connect said supporting element to said screw,
    said narrow location at its inner surface including a contact element being designed and arranged to face said thread runout, said contact element being designed to have a conical shape and a length being more than the lead of said thread, said contact element having a cone angle, the cone angle of said contact element not being more than the cone angle of said thread runout and being approximately between 3° and 8°.

13. The fastener assembly of claim 12, wherein said narrow location includes a plurality of contact element being formed by local impressions, said local impressions being arranged at an inner surface of said supporting element to be uniformly distributed about the circumference of said supporting element.

14. The fastener assembly of claim 12, wherein said contact element is formed by a continuous inclined surface being located at an inner surface of said supporting element.

15. The fastener assembly of claim 14, wherein said supporting element including said inclined surface is designed as a disk.

16. The fastener assembly of claim 15, wherein said disk is captively connected to said screw after rolling said thread of said threaded portion.

17. The fastener assembly of claim 16, wherein said disk is captively connected to said screw after rolling said thread of said threaded portion.

* * * * *